March 25, 1941. H. J. FINDLEY 2,236,476

AUTOMOBILE HEATING SYSTEM

Filed May 6, 1939 2 Sheets-Sheet 1

INVENTOR
HOWARD J. FINDLEY
BY *Kwis Hudson & Kent*
ATTORNEYS

March 25, 1941.   H. J. FINDLEY   2,236,476
AUTOMOBILE HEATING SYSTEM
Filed May 6, 1939   2 Sheets-Sheet 2

INVENTOR
HOWARD J. FINDLEY
BY Kwis Hudson & Kent
ATTORNEYS

Patented Mar. 25, 1941

2,236,476

UNITED STATES PATENT OFFICE 2,236,476

AUTOMOBILE HEATING SYSTEM

Howard J. Findley, Euclid, Ohio, assignor to Eaton Manufacturing Company, Cleveland, Ohio, a corporation of Ohio Application May 6, 1939, Serial No. 272,173

2 Claims. (Cl. 237—59)

This invention relates to automobile heating apparatus and more particularly to an improved arrangement or system by which a more satisfactory distribution of heat to different parts of an automobile can be obtained.

An object of my invention is to provide an improved automobile heating apparatus or system utilizing heat-containing medium taken from the engine cooling system and employing a plurality of heaters to which such medium can be supplied in accordance with the heat requirements of the portions of the vehicle which are served by the respective heaters.

Another object of my invention is to provide an improved automobile heating system having a plurality of heaters located at different points in the automobile and embodying motor driven air-impelling means, such system also including means for selectively controlling the operation of the heaters in accordance with the heat requirements of the portions of the vehicle served thereby.

Still another object of my invention is to provide an improved automobile heating system embodying a defrosting heater located to supply heat to the windshield and another heater located under the driver's seat and operable to deliver heat into the front and rear passenger compartments, such system also including means for supplying heat-containing medium from the engine cooling system to such heaters in series and with the hotter medium being supplied first to the defrosting heater.

Other objects and advantages of my invention will be apparent from the following description when taken in conjunction with the accompanying sheets of drawings in which.

Further and more detailed reference will now be made to the accompanying drawings for the purpose of describing the illustrated embodiments of my improved automobile heating arrangement or system. However, before proceeding with such detailed description, it will be understood, of course, that the invention is not limited to the particular arrangements herein disclosed, but includes various other modifications and arrangements coming within the scope of the appended claims.

Figure 1:
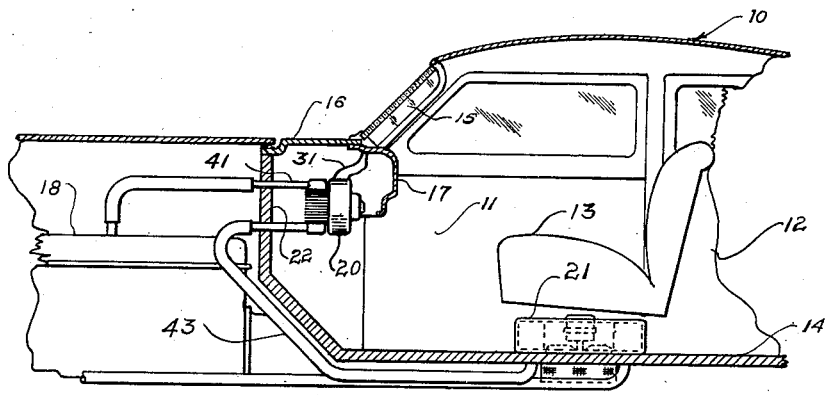
Fig. 1 is a partial longitudinal sectional view, somewhat diagrammatic in form, taken through an automobile equipped with my improved heating system.

In Fig. 1 of the drawings I show an automobile 10 equipped with one form of my improved heating system. The automobile here shown may be of the conventional or usual construction having front and rear compartments 11 and 12 with a driver's seat 13 disposed therebetween and spaced above the floor 14. The body of this automobile may also include a windshield 15 extending above or across the cowl 16 and an instrument panel 17 extending rearwardly and downwardly with respect to the lower edge of the windshield. The automobile here shown may also include an internal combustion engine 18 and a cooling system by which water or other appropriate medium is circulated through a portion of the engine for regulating the operating temperature thereof.

My improved heating system is here shown embodied in the automobile 10 and comprises individual heaters 20 and 21. The heater 20 is located so as to supply heat to the windshield 15 for maintaining the latter free of snow, sleet or moisture and may, therefore, be conveniently termed an auxiliary or defrosting heater. This defrosting heater, which may be of relatively small size or capacity, may be located at some suitable point in the front compartment, preferably up under the cowl 16 and between the instrument panel 17 and the dashboard 22. The heater 21 may be located at any desired point in the automobile such as a point spaced relatively remote from the windshield 15. For example it may be located under the seat 13, and as will be presently explained, may operate to supply heated air directly to the front and rear compartments 11 and 12. Since the heater 21 is of relatively large size or capacity and, in this instance, is located under the seat 13, it may conveniently be referred to as the main or under-seat heater.

It will be understood, of course, that the heaters 20 and 21 may be of any suitable construction which will enable them to accomplish the heating function for which they are intended. Appropriate constructions for these heaters are shown in Figs. 1 and 2, but obviously various other forms of construction could be provided.

Figure 2:
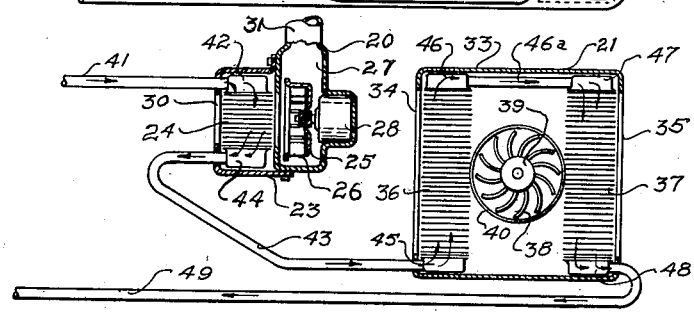
Fig. 2 is another more or less diagrammatic view of my automobile heating system showing the defrosting heater thereof in vertical section and the under-seat heater in horizontal section.

As shown in Fig. 2, the heater 20 may comprise a casing or shell 23 containing a heat-exchange core 24 and air-impelling means 25. The air-impelling means may comprise a blower 26 operating in a blower housing 27 and mounted on the shaft of an electric motor 28 by which it is driven. The heat-exchange core 24 may be located adjacent an air intake opening 30 so as to heat the air which is drawn into the housing 23 by the blower. During the operation of the defrosting heater here shown, recirculated air from within the automobile is drawn in through the opening 30 and the core 24 by the blower 26 and is forced or delivered thereby against the windshield 15, or adjacent thereto, through the nozzle or conduit 31 leading from the blower housing 27.

Figure 6:
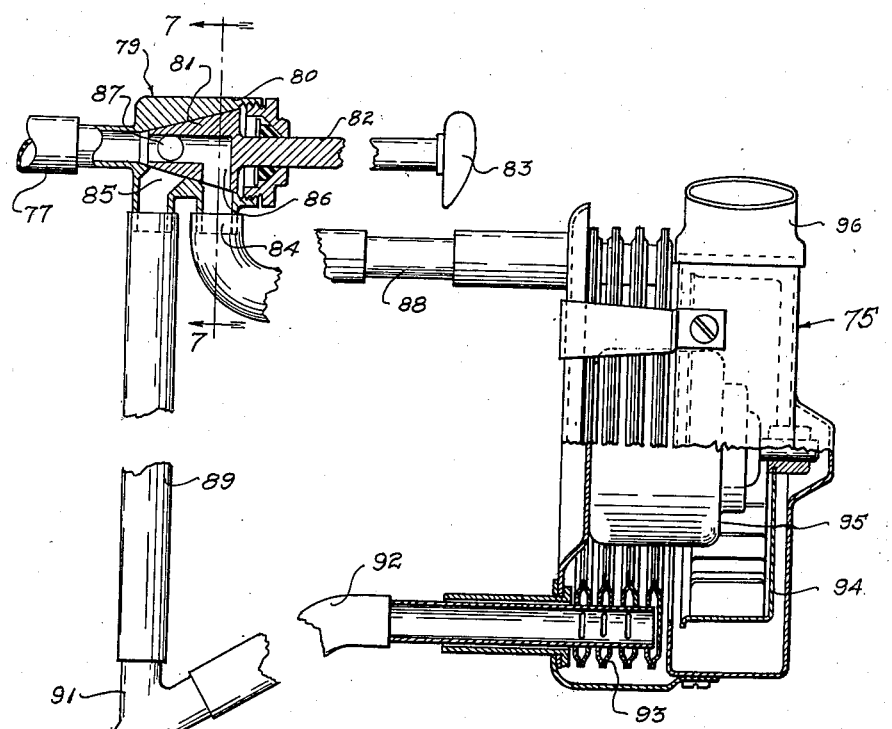
Fig. 6 is another more or less diagrammatic view showing a modified form of my heating system with the defrosting heater thereof shown in partial vertical section and the under-seat heater shown in vertical longitudinal section.
Figure 6:
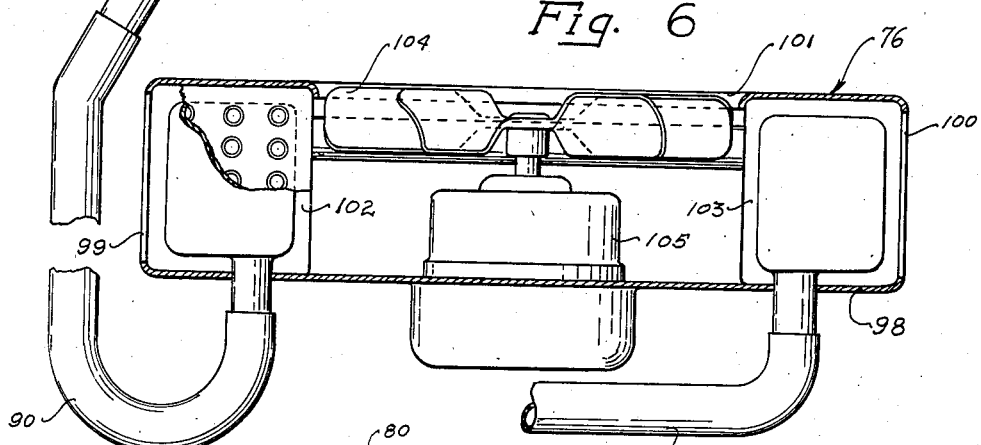

The main or under-seat heater 21 may, as shown in this instance, comprise a quadrangular shell or casing 33 having openings 34 and 35 in its end walls for delivering heated air directly into the front and rear compartments 11 and 12. Heat-exchange cores 36 and 37 are located adjacent the discharge openings 34 and 35 so as to heat the air being delivered through these openings. An air-impelling means comprising a fan or blower 38 and an electric driving motor 39 therefor is located between the cores 36 and 37 and operates to draw air into the casing 33 and to deliver the same through the cores and the discharge openings 34 and 35. In this instance the fan is arranged to draw in fresh air from outside the vehicle through an opening 40 provided in the bottom wall of the casing 33 and registering with an opening in the floor 14 of the automobile body. The intake opening and fan could be located to draw in recirculated air instead of fresh air, as shown in the arrangement of Fig. 6.

In the operation of my heating system, as thus far described, heat-containing medium such as hot water, is supplied to the heaters 20 and 21 from the cooling system of the engine 18. I find that best results are obtained by supplying the heat-containing medium to the cores of the heaters 20 and 21 in succession, that is in series, and for this purpose I provide piping including a supply pipe or conduit 41 which connects the end tank 42 of the heat-exchange core 24 of the defrosting heater with the cooling system of the engine 18. A pipe or conduit 43 connects the other end tank 44 of the heat-exchange core 24 with an end tank of one of the cores or core sections of the heater 21, in this instance the end tank 45 of the heat-exchange core 36. The opposite end tank 46 may be connected with the corresponding end tank 47 of the core 37 by the short pipe 46a. The other end tank 48 of the core 37 may be connected with the engine cooling system by a return conduit 49.

With the piping arrangement just described, it will be seen that the heat-containing medium will be supplied to the heaters 20 and 21 in series and will pass first through the heat-exchange core of the heater 20 and then through the cores 36 and 37 of the heater 21 in succession. The direction of flow of the heat-containing medium could be reversed, that is to say could be supplied first to the heater 21, but I prefer to supply the hotter medium to the heater having the lowest capacity or heat-drop first, in this instance the defrosting heater 20, and then to the heater having the larger capacity or heat-drop, in this instance the under-seat heater 21. By supplying the heat-containing medium to the heaters in the manner just explained, it will be seen that the heater 20 will be able to deliver a supply of heat to the windshield which is adequate for defrosting purposes, but the heat-drop in the medium will be relatively small, that is to say the main body of heat will be retained by the medium and will be carried thereby to the cores 36 and 37 of the main or under-seat heater 21 for heating the air which is to be delivered into the automobile compartments 11 and 12.

The amount of heat desired from the heaters 20 and 21 can be controlled by controlling the operation of their air-impelling means and, for this purpose, I provide circuit connections and switch means by which the starting and stopping and speed of operation of the motor driven air-impelling means of these heaters can be readily regulated by the driver of the automobile. Such control of the air-impelling means provides a suitable control over the operation of the heaters because heat will be extracted from the heat-containing medium only in proportion to the volume of air which is caused to pass through the core.

Figure 3:
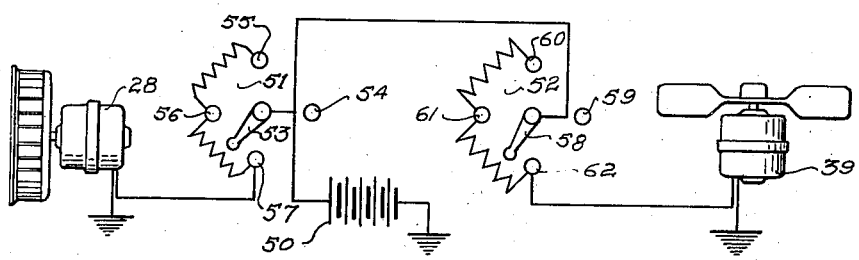
Fig. 3 is another diagrammatic view showing electric circuits and switch control means for my heating system.

As shown in Fig. 3 such circuit connections may include appropriate conductors for connecting the electric motors 28 and 39 in circuit with the storage battery 50 of the vehicle through the control switches or rheostats 51 and 52. The movable member 53 of the switch 51 has four different positions or settings designated 54, 55, 56 and 57 which provide, respectively, an off or stopped position, and slow, medium and high speed positions. Similarly, the movable member 58 of the switch 52 has positions or settings 59, 60, 61 and 62 which provide, respectively, a stopped or off position, and low, medium and high speed positions.

Figure 4:
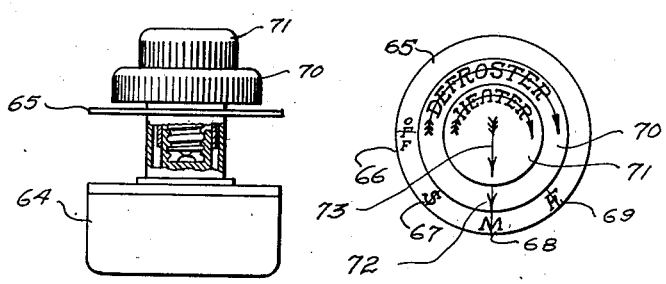
Fig. 4 is a side elevation, with portions broken away, further illustrating the switch means for selectively controlling the individual heaters of my system.
Figure 5:
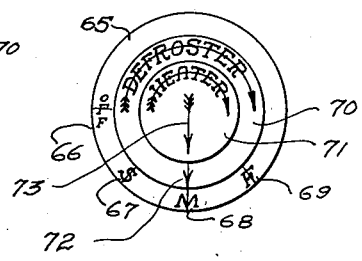
Fig. 5 is a front or end elevation of this switch means.

The switches 51 and 52 can, as shown in Figs. 4 and 5, be embodied in a single device 64 which may be mounted on the instrument panel 17 in a position readily accessible to the driver of the automobile. This device may include a dial plate or member 65 having markings or indications 66, 67, 68 and 69 designating, respectively, an off or stopped position, and slow, medium and fast running positions. The device 64 may also include a pair of concentrically mounted rotatable actuating members or knobs 70 and 71 which are connected, respectively, with the movable switch members 53 and 58. The knobs 70 and 71 may be provided, respectively with reference marks or pointers 72 and 73 for co-operation with the designations of the dial 65.

In Fig. 6 of the drawings I show a modified form of my automobile heating system which also embodies a relatively small-capacity auxiliary or windshield defrosting heater 75 and a main heater 76 which may be located at another point in the automobile spaced from the windshield such as under the driver's seat. Heat-containing medium, such as hot water from the engine cooling system, may be circulated through the heaters 75 and 76 and for this purpose I provide main supply and return pipes or conduits 77 and 78.

The operation of the heaters 75 and 76 may be controlled by regulating the supply of heat-containing medium thereto. This may be accomplished by the use of a valve 79 located in the main supply pipe or conduit 77 and connected with the heaters by appropriate piping which will be presently described. The valve 79 may be of any suitable construction and may comprise a housing 80 and a rotatable or oscillatable valve member or plug 81 therein. The plug may have an actuating stem 82 projecting from the valve casing and carrying a knob or handle 83 which may be located on or adjacent the instrument panel of the automobile so as to be readily accessible to the driver. The valve housing 80 may have a pair of discharge ports or passages 84 and 85 with which ports 86 and 87 of the plug register, respectively, when the plug is rotated or oscillated. The plug has an axial passage or recess therein connecting its ports 86 and 87 with the supply pipe 77.

The discharge passage 84 of the valve 79 is connected with the defrosting heater 75 by a supply pipe 88 and the discharge passage 85 of the valve is connected with the main heater 76 by the supply pipes 89 and 90 and the Y-fitting 91 therebetween. A pipe 92 leading from the heater 75 also connects with the Y-fitting 91. The piping arrangement just described thus provides two paths of supply for the heater 76, one being through the heater 75 by way of pipes 88, 92 and 90, and the other being a direct path from the valve 79 through pipes 89 and 90.

Figure 7:
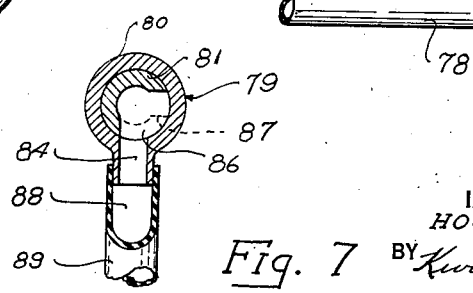
Fig. 7 is a transverse sectional view taken through a control valve of this system as indicated by line 7—7 of Fig. 6.

As will be seen from Fig. 7, the port 86 of the valve plug 81 may be a slot or sector of greater angular extent than the port 87 so that the plug can be moved to a position in which both of the ports 86 and 87 are in communication with the passages 84 and 85 or to another position in which the passage 85 is closed while the port 86 remains in communication with the passage 84 or to still another position in which both passages 84 and 85 are closed. By use of the valve and piping arrangement shown in Fig. 6 and just described, it will be seen that heating medium can be supplied to the defrosting heater 75 with the return therefrom passing through the heater 76, or can be supplied more or less directly to the heater 76 through the pipe 89 while heating medium is also being supplied directly to the heater 75 by the pipe 88. In other words, with the valve plug 81 set in the position shown in Fig. 6, heating medium will be supplied to the defrosting heater 75 and will be returned through the heater 76, but after the valve plug is rotated to bring the port 87 thereof into register with the port 85, heating medium will be supplied directly to the main heater 76 through the pipe 89 as well as indirectly through the heater 75.

Any suitable heater construction can be used in the heaters 75 and 76. In this instance I show the heater 75 as having an annular heat-exchange core 93 and a blower 94 adapted to be driven by an electric motor 95 for drawing air through the core and delivering the same through the nozzle or conduit 96 to the windshield of the automobile. As here shown, the motor 95 may extend into the central recess of the annular core 93. The heater 76 may comprise a quadrangular casing 98 having discharge openings 99 and 100 in its end walls and may have an air intake opening 101 in the top wall thereof. This heater may also include heat-exchange cores 102 and 103 located adjacent the openings 99 and 100, respectively, and a fan 104 driven by an electric motor 105 and operable in the opening 101 for taking recirculated air from the automobile compartment and discharging the same through the cores 102 and 103 and the discharge openings 99 and 100.

It will be understood, of course, that in addition to the control afforded by the valve 79, the operation of the heaters 75 and 76 may be further controlled or regulated by controlling the electric motors 95 and 105. This may be accomplished by providing these motors with circuit connections and switch means similar to that of Fig. 3 whereby the air-impelling means of the heaters 75 and 76 can be started, stopped or the speed thereof regulated, independently of each other.

From the foregoing description and the accompanying drawings it will now be readily understood that I have provided an improved automobile heating arrangement or system in which heaters can be located at different points in the automobile and such heaters can be controlled and regulated independently of each other in accordance with the heat requirements of the portions of the automobile being served thereby. It will also be seen that I provide for supplying heat-containing medium to the heaters from the engine-cooling system in a manner such that the medium passes through the heaters in succession or series with the hotter medium being supplied to the heater which has the lower heat-drop or heating capacity. It will be seen furthermore that my improved heating system contemplates the use of a relatively small defrosting or auxiliary heater located to supply heat to the windshield of an automobile and a relatively larger main heater located at another point of the automobile such as under the driver's seat, and which heaters are connected with each other and the engine cooling system so that the heating medium will pass through the heaters in succession and will travel from the defrosting heater to the main heater.

While I have illustrated and described my improved automobile heating system in a somewhat detailed manner, it will be understood, of course, that I do not wish to be limited to the precise forms of construction and arrangements herein disclosed, but regard my invention as including such changes and modifications as do not constitute a departure from the spirit of the invention and the scope of the appended claims.

Having thus described my invention, I claim:

1. In heating apparatus for an automobile having a windshield and an engine cooling system, a defrosting heater located to deliver heated air to the windshield and comprising a heat-exchange core and a motor-driven air-impelling means, another heater located in the automobile at a point more remote from the windshield and comprising a heat-exhange core and a motor-driven air-impelling means, pipes connecting the heat-exchange cores with said system and with each other, and valve means with said pipes having one setting for supplying heat-containing medium to the defrosting heater and another setting for supplying heat-containing medium directly to the defrosting heater and to the second-mentioned heater simultaneously.

2. In heating apparatus for an automobile having a windshield and an engine cooling system, a defrosting heater located to deliver heated air to the windshield and comprising a heat-exchange core and a motor-driven air-impelling means, another heater located in the automobile at a point more remote from the windshield and comprising a heat-exchange core and a motor-driven air-impelling means, pipes connecting the heat-exchange cores with said system and with each other, and valve means with said pipes having one setting for supplying heat-containing medium to the defrosting heater and another setting for supplying heat-containing medium directly to the defrosting heater and to the second-mentioned heater simultaneously, energizing circuits for the motors of the motor-driven air-impelling means of said heaters, and switch means in said circuits for selectively controlling the air-impelling means of said heaters.

HOWARD J. FINDLEY.